(12) United States Patent
Hori (10) Patent No.: US 8,471,954 B2
(45) Date of Patent: Jun. 25, 2013

(54) ELECTRONIC CAMERA

(75) Inventor: Takahiro Hori, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 370 days.

(21) Appl. No.: 12/785,001

(22) Filed: May 21, 2010

(65) Prior Publication Data

US 2010/0295986 A1 Nov. 25, 2010

(30) Foreign Application Priority Data

May 22, 2009 (JP) ................. 2009-124742

(51) Int. Cl.
*H04N 5/232* (2006.01)
*G03B 13/00* (2006.01)

(52) U.S. Cl.
USPC .......................................... 348/354

(58) Field of Classification Search
USPC .......................................... 348/254
See application file for complete search history.

(56) References Cited

U.S. PATENT DOCUMENTS

| | | | | |
|---|---|---|---|---|
| 5,113,214 | A | * | 5/1992 | Nagata et al. ............... 396/78 |
| 7,808,543 | B2 | * | 10/2010 | Sasaki ........................ 348/345 |
| 7,831,138 | B2 | * | 11/2010 | Nakahara .................... 396/121 |
| 8,363,155 | B2 | * | 1/2013 | Tsubusaki ................... 348/357 |
| 2003/0030740 | A1 | | 2/2003 | Tsujino |
| 2005/0157188 | A1 | | 7/2005 | Kubo |
| 2007/0076100 | A1 | | 4/2007 | Muraki |

FOREIGN PATENT DOCUMENTS

| | | | |
|---|---|---|---|
| JP | 2003-262788 | * | 9/2003 |
| JP | 2003-262788 | A | 9/2003 |
| JP | 2004-289870 | A | 10/2004 |
| JP | 2004-325517 | A | 11/2004 |
| JP | 2005-210215 | A | 8/2005 |
| JP | 2005-283776 | A | 10/2005 |
| JP | 2007-097033 | A | 4/2007 |
| JP | 2008-072665 | A | 3/2008 |
| JP | 2009-104090 | A | 5/2009 |
| WO | 2008/023709 | A1 | 2/2008 |

OTHER PUBLICATIONS

Office Action mailed Feb. 5, 2013 in corresponding Japanese Patent Application 2009-124742. English translation.

* cited by examiner

*Primary Examiner* — Albert Cutler
(74) *Attorney, Agent, or Firm* — Westerman, Hattori, Daniels & Adrian, LLP (57) ABSTRACT

An electronic camera includes an imager which outputs an object scene image in a designated cycle. The first changer changes a distance from a focus lens to the imaging surface. The first adjustor adjusts the designated cycle to a length corresponding to an illuminance of the object scene in association with a process of the first changer. The first specifier specifies a distance range including a focal point in parallel with the process of the first changer. The second changer changes the distance from the focus lens to the imaging surface in the distance range specified by the first specifier. The second adjustor adjusts the designated cycle to a length corresponding to a contrast of the object scene in association with a process of the second changer. The second specifier specifies the distance corresponding to the focal point in parallel with the process of the second changer.

8 Claims, 12 Drawing Sheets

(A) ROUGH ADJUSTMENT-USE TABLE TBL1

| LENS POSITION P(i) | AF EVALUATION VALUE Yh(i) |
|---|---|
| i=1 | |
| i=2 | |
| i=3 | |
| ⋮ | ⋮ |

(B) FINE ADJUSTMENT-USE TABLE TBL2

| LENS POSITION P(i) | AF EVALUATION VALUE Yh(i) |
|---|---|
| i=1 | |
| i=2 | |
| i=3 | |
| ⋮ | ⋮ |

ELECTRONIC CAMERA

CROSS REFERENCE OF RELATED APPLICATION

The disclosure of Japanese Patent Application No. 2009-124742, which was filed on May 22, 2009, is incorporated herein by reference.

BACKGROUND OF THE INVENTION

1. Field of the Invention

The present invention relates to an electronic camera. More specifically, the present invention relates to an electronic camera which adjusts a distance from a focus lens to an imaging surface to a distance corresponding to a focal point.

2. Description of the Related Art

According to one example of this type of camera, when a brightness of a subject is insufficient, a frame rate of a CCD imager at a time of a focus adjustment is changed from 30 fps to 15 fps. Thereby, an S/N ratio of a camera signal is improved, and a focal adjustment accuracy based on the camera signal is improved.

However, for adjusting the frame rate of the CCD imager in an AF process, if a parameter to be referred to is restricted to the brightness of the subject, the improvement in focal performance is limited.

SUMMARY OF THE INVENTION

An electronic camera according to the present invention, comprises: an imager having an imaging surface that captures an object scene through a focus lens and outputting an object scene image in a designated cycle; a first changer which changes a distance from the focus lens to the imaging surface; a first adjustor which adjusts a length of the designated cycle to a length corresponding to an illuminance of the object scene, in association with the change process of the first changer; a first specifier which specifies a distance range including a focal point based on the object scene image outputted from the imager, in parallel with the change process of the first changer; a second changer which changes the distance from the focus lens to the imaging surface in the distance range specified by the first specifier; a second adjustor which adjusts the length of the designated cycle to a length corresponding to a contrast of the object scene, in association with the change process of the second changer; and a second specifier which specifies a distance corresponding to the focal point based on the object scene image produced by the imager, in parallel with the change process of the second changer.

A focusing control program product according to the present invention is a focusing control program product executed by a processor of an electronic camera provided with an imager having an imaging surface that captures an object scene through a focus lens and outputting an object scene image in a designated cycle, comprises: a first changing step of changing a distance from the focus lens to the imaging surface; a first adjusting step of adjusting a length of the designated cycle to a length corresponding to an illuminance of the object scene, in association with the change process in the first changing step; a first specifying step of specifying a distance range including a focal point based on the object scene image outputted from the imager, in parallel with the change process in the first changing step; a second changing step of changing the distance from the focus lens to the imaging surface in the distance range specified by the first specifying step; a second adjusting step of adjusting the length of the designated cycle to a length corresponding to a contrast of the object scene, in association with the change process in the second changing step; and a second specifying step of specifying a distance corresponding to the focal point based on the object scene image produced by the imager, in parallel with the change process in the second changing step.

A focusing control method according to the present invention is a focusing control method executed by an electronic camera provided with an imager having an imaging surface that captures an object scene through a focus lens and outputting an object scene image in a designated cycle, comprises: a first changing step of changing a distance from the focus lens to the imaging surface; a first adjusting step of adjusting a length of the designated cycle to a length corresponding to an illuminance of the object scene, in association with the change process in the first changing step; a first specifying step of specifying a distance range including a focal point based on the object scene image outputted from the imager, in parallel with the change process in the first changing step; a second changing step of changing the distance from the focus lens to the imaging surface in the distance range specified by the first specifying step; a second adjusting step of adjusting the length of the designated cycle to a length corresponding to a contrast of the object scene, in association with the change process in the second changing step; and a second specifying step of specifying a distance corresponding to the focal point based on the object scene image produced by the imager, in parallel with the change process in the second changing step.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
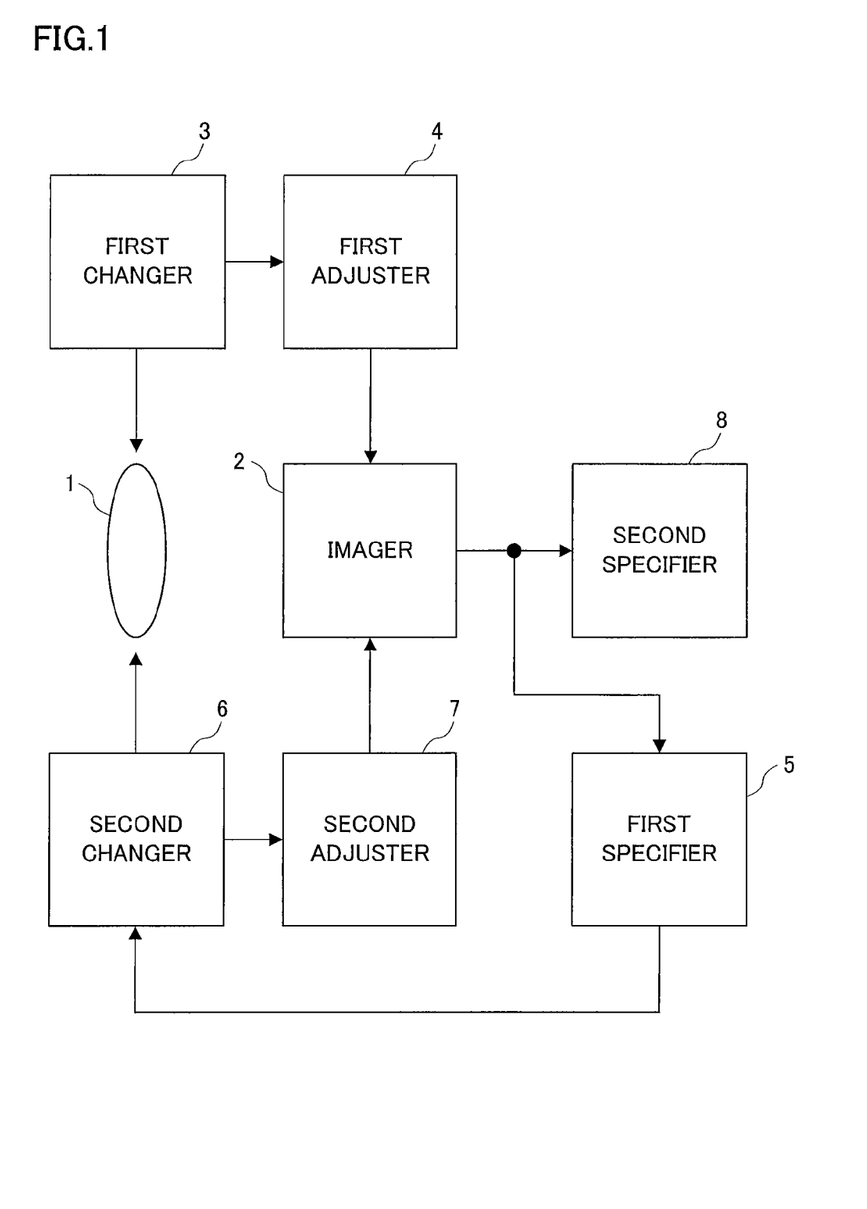
FIG. 1 is a block diagram showing a basic configuration of one embodiment of the present invention.

With reference to FIG. 1, an electronic camera according to one embodiment of the present invention is basically configured as follows: An imager 2 includes an imaging surface capturing an object scene through a focus lens 1 and outputs an object scene image in a designated cycle. A first changer 3 changes a distance from the focus lens 1 to the imaging surface. A first adjustor 4 adjusts a length of the designated cycle to a length corresponding to an illuminance of the object scene, in association with the change process of the first changer 3. A first specifier 5 specifies a distance range including a focal point, based on the object scene image outputted from the imager 2, in parallel with the change process of the first changer 3. A second changer 6 changes the distance from the focus lens 1 to the imaging surface in the distance range specified by the first specifier 5. A second adjustor 7 adjusts the length of the designated cycle to a length corresponding to a contrast of the object scene, in association with the change process of the second changer 6. A second specifier 8 specifies the distance corresponding to the focal point based on the object scene image produced by the imager 2, in parallel with the change process of the second changer 6.

Thus, the distance from the focus lens 1 to the imaging surface is changed, firstly, in order to specify the distance range including the focal point, then, to specify the distance corresponding to the focal point. Moreover, both the distance range including the focal point and the distance corresponding to the focal point are specified based on the object scene image outputted from the imager 2. Furthermore, the length of the output cycle of the object scene image is adjusted with reference to the illuminance of the object scene when the distance range including the focal point is specified, and adjusted with reference to the contrast of the object scene when the focal point is specified.

The length of the designated cycle is adjusted with reference to the illuminance of the object scene when the focal point is roughly specified while the length of the designated cycle is adjusted with reference to the contrast of the object scene when the focal point is strictly specified. In this way, it is possible to improve a performance for focusing on an object of a high contrast present under a low illuminance.

Figure 2:
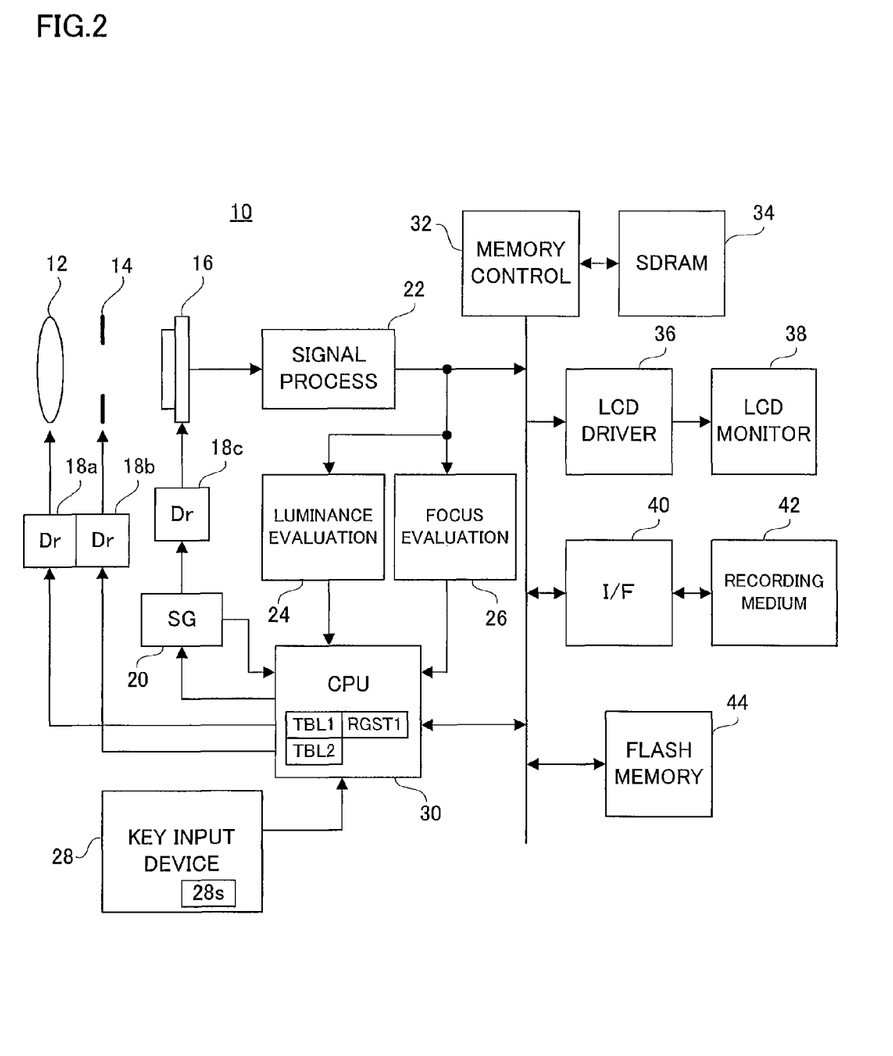
FIG. 2 is a block diagram showing a configuration of one embodiment of the present invention.

With reference to FIG. 2, a digital camera 10 according to this embodiment includes a focus lens 12 and an aperture mechanism 14 respectively driven by drivers 18a and 18b. An optical image of an object scene that undergoes the focus lens 12 and the aperture mechanism 14 enters, with irradiation, an imaging surface of an imaging device 16, and is subjected to photoelectric conversion. Thereby, electric charges representing an object scene image are produced.

When a power supply is inputted, a CPU 30 commands a driver 18c to repeatedly perform a pre-exposure operation and a thinning-out reading-out operation in order to execute a through-image process. In response to a vertical synchronization signal Vsync cyclically generated from an SG (Signal Generator) 20, the driver 18c performs the pre-exposure on the imaging surface and also reads out the electric charges produced on the imaging surface in a thinning-out manner. From the imaging device 16, low-resolution raw image data based on the read-out electric charges is cyclically outputted in a raster scanning manner.

The generation cycle of the vertical synchronization signal Vsync, i.e., an imaging cycle, is set to one of "1/60 seconds" and "1/30 seconds" under the control of the CPU 30. The pre-exposure time period is adjusted in a range where a time period equivalent to the generation cycle of the vertical synchronization signal Vsync is an upper limit. Moreover, the raw image data outputted from the imaging device 16 indicates a frame rate of 60 fps corresponding to "1/60 seconds" and indicates a frame rate of 30 fps corresponding to "1/30 seconds".

A signal processing circuit 22 performs processes, such as white balance adjustment, color separation, and YUV conversion, on the raw image data outputted from the imaging device 16, and writes YUV formatted-image data created thereby into an SDRAM 34 through a memory control circuit 32. An LCD driver 36 repeatedly reads out the image data written into the SDRAM 34 through the memory control circuit 32, and drives an LCD monitor 38 based on the read-out image data. As a result, a real-time moving image (through image) of the object scene is displayed on a monitor screen.

Figure 3:
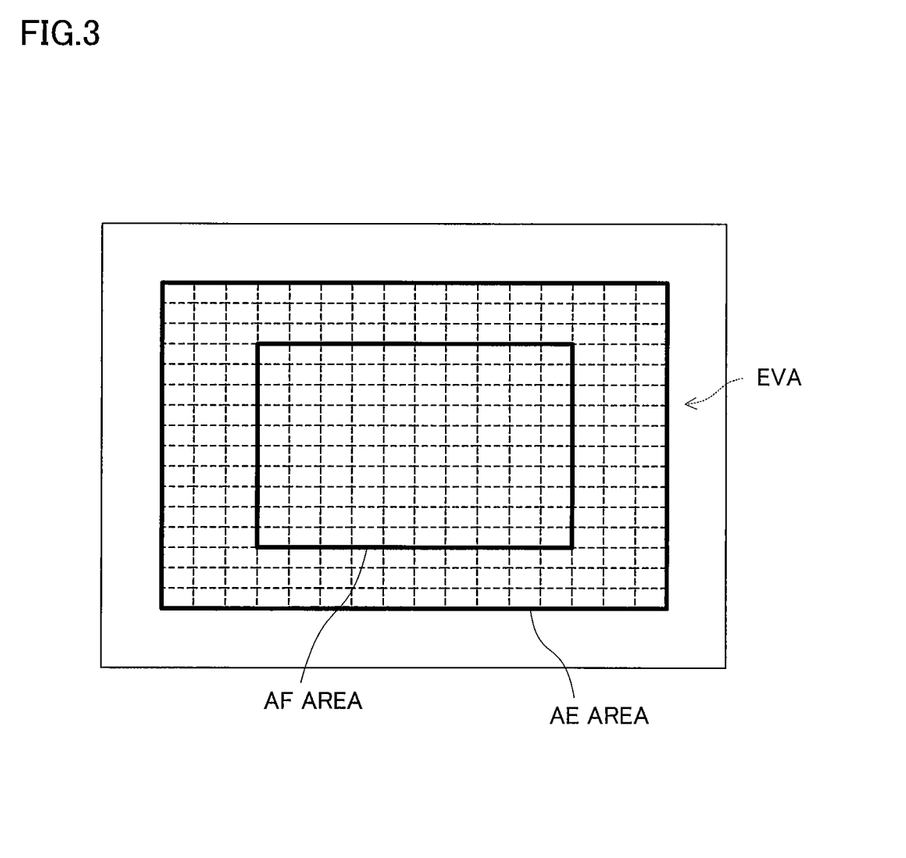
FIG. 3 is an illustrative view showing one example of an allocation state of an evaluation area in an imaging surface.

With reference to FIG. 3, an evaluation area EVA is allocated to a center of the imaging surface. The evaluation area EVA is divided into 16 parts in each of a vertical direction and a horizontal direction. That is, the evaluation area EVA is equivalent to a group of a total of 256 divided areas.

A luminance evaluating circuit 24 defines, as an AE area, a whole evaluation area EVA, and integrates Y data belonging to the AE area, out of Y data outputted from the signal processing circuit 22, at each generation of the vertical synchronization signal Vsync. An integral value obtained thereby is repeatedly outputted, as an AE evaluation value, from the luminance evaluating circuit 24.

The CPU 30 repeatedly executes a through image-use AE process (simple AE process) in parallel with the above-described through-image process, in order to calculate an appropriate EV value based on the AE evaluation value outputted from the luminance evaluating circuit 24. An aperture amount and an exposure time period that define the calculated appropriate EV value are set to the drivers 18b and 18c, respectively. As a result, a brightness of the through image displayed on the LCD monitor 38 is moderately adjusted.

When a shutter button 28s on a key input device 28 is half-depressed, a strict recording-use AE process is executed in order to calculate the optimal EV value based on the AE evaluation value outputted from the luminance evaluating circuit 24. Similarly to the above-described case, an aperture amount and an exposure time period that define the calculated optimal EV value are set to the drivers 18b and 18c, respectively. As a result, the brightness of the through image displayed on the LCD monitor 38 is strictly adjusted.

Upon completion of the recording-use AE process, an AF process based on output of a focus evaluating circuit 26 is executed. A focus evaluating circuit 26 defines, as an AF area, one portion of the evaluation area EVA shown in FIG. 3, and integrates a high-frequency component of Y data belonging to the AF area, out of the Y data outputted from the signal processing circuit 22, in response to the vertical synchronization signal Vsync. The integral value obtained thereby is repeatedly outputted, as an AF evaluation value, from the focus evaluating circuit 26.

The CPU 30 fetches the AF evaluation values thus outputted from the focus evaluating circuit 26, and seeks a position corresponding to a focal point by a so-called hill-climbing process. The focus lens 12 moves stepwise in an optical axis direction at each generation of the vertical synchronization signal Vsync, and thereafter, is placed at the position corresponding to the focal point.

When the shutter button 28s is fully depressed, a recording process is executed. The CPU 30 commands the driver 18c to execute a main exposure operation and all-pixel reading-out, one time each. The driver 18c performs the main exposure on the imaging surface in response to the generation of the vertical synchronization signal Vsync, and reads out all the electric charges produced on the imaging surface in a raster scanning manner. As a result, high-resolution raw image data representing the object scene is outputted from the imaging device 16.

The outputted raw image data is subjected to a process similar to that described above, and as a result, high-resolution image data according to a YUV format is secured in the SDRAM 34. An I/F 40 reads out the high-resolution image data thus accommodated in the SDRAM 34 through the memory control circuit 32, and then, records the read-out image data on a recording medium 42 in a file format. It is noted that the through-image process is resumed at a time point when the high-resolution image data is accommodated in the SDRAM 34.

Figure 5:
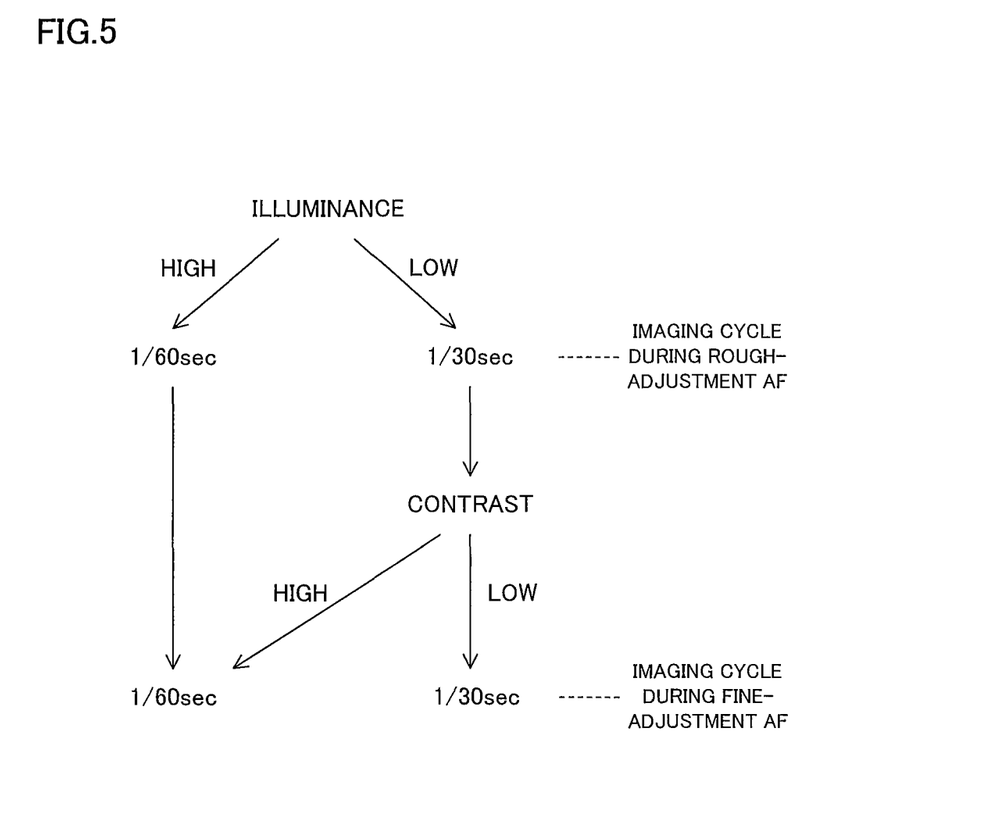
FIG. 5 is an illustrative view showing one example of an adjusting operation of an imaging cycle.

The AF process is configured by: a rough-adjustment AF process for roughly specifying a focal point; and a fine-adjustment AF process for strictly specifying the focal point. The rough-adjustment AF process and the fine-adjustment AF process are executed as follows:

In the rough-adjustment AF process, firstly, the latest AE evaluation value referred to for the recording-use AE process is defined as "AEnew", and the latest AE evaluation value AEnewe is compared with a reference value REF1. With reference to FIG. 5, when AEnew≧REF1 is determined, the imaging cycle is set to "1/60 seconds", regarding that the illuminance of the object scene is high. On the other hand, when AEnew<REF1 is determined, the imaging cycle is set to "1/30 seconds", regarding that the illuminance of the object scene is low.

Figure 6:
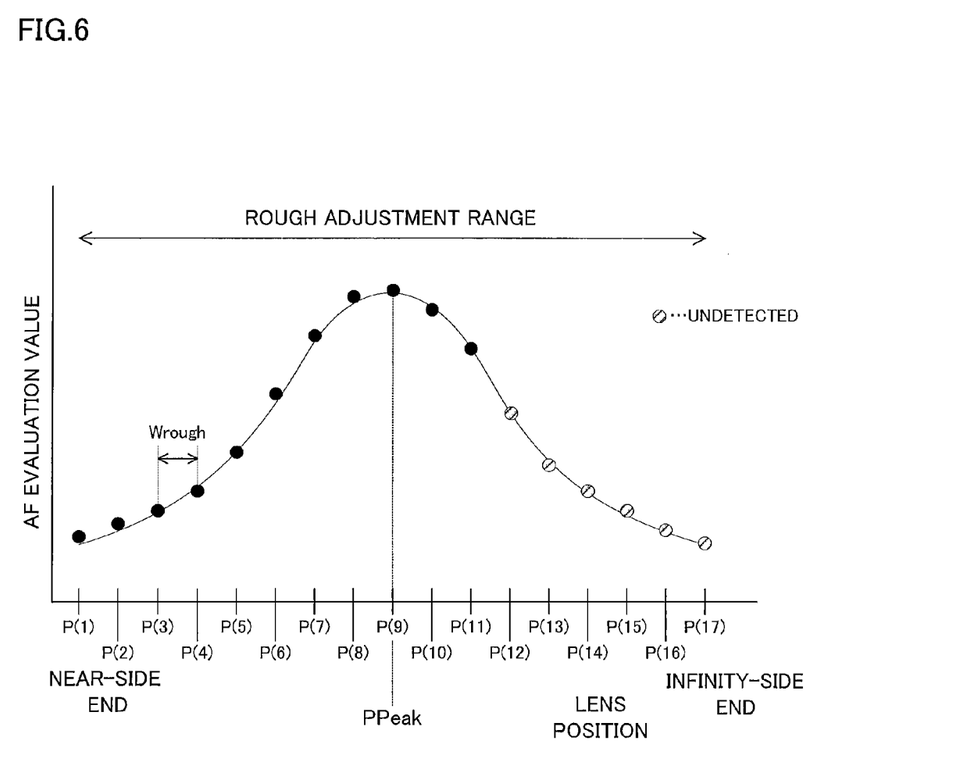
FIG. 6 is a graph showing one example of a rough-adjustment AF operation.

Upon completion of the adjustment of the imaging cycle, the focus lens 12 is placed at a near-side end portion in a rough adjustment range shown in FIG. 6, and is moved toward an infinity-side end portion by each moving amount Wrough. The focus evaluating circuit 26 outputs, as an AF evaluation value Yh(i), a high-frequency component of the object scene image captured at each of a plurality of lens positions P(i) (i: 1, 2, 3, ... ) separated by a distance equivalent to the moving amount Wrough. On the rough adjustment-use table TBL1 shown in FIG. 4(A), each AF evaluation value Yh(i) thus obtained is written.

The AF evaluation value fetched this time from the focus evaluating circuit 26 is registered in a register RGST 1 as a maximum AF evaluation value AFmax when the AF evaluation value is equal to or more than the AF evaluation values fetched until last time. When the AF evaluation value fetched thereafter falls below the maximum AF evaluation value AFmax for two consecutive times, it is regarded that the focus lens 12 strides over the focal point. Then, the lens position corresponding to the maximum AF evaluation value AFmax registered in the register RGST1 is detected as a provisional peak position PPeak, and one portion of the range centered around the detected provisional peak position PPeak is defined as a fine adjustment range. A width of the fine adjustment range is equivalent to five times a moving amount Wfine described later.

According to FIG. 6, the AF evaluation value is maximum corresponding to a lens position P(9), and the lens position P(9) is set as the provisional peak position PPeak. The rough-adjustment AF process is ended without acquiring the AF evaluation values Yh(12) to Yh(17) at the lens positions P(12) to P(17).

The fine-adjustment AF process is started after the fine adjustment range is defined With reference to FIG. 5 again, if the imaging cycle during the rough-adjustment AF process is 1/60 seconds, then the imaging cycle during the fine-adjustment AF process is set also to 1/60 seconds. If the imaging cycle during the rough-adjustment AF process is 1/30 seconds, then the maximum AF evaluation value AFmax registered in the register RGST1 is compared with a reference value REF2. If AFmax≧REF2 is determined, then the imaging cycle is set to "1/60 seconds", regarding that the contrast of the object scene is high. On the other hand, if AFmax<REF2 is determined, the imaging cycle is set to "1/30 seconds", regarding that the contrast of the object scene is low.

Figure 7:
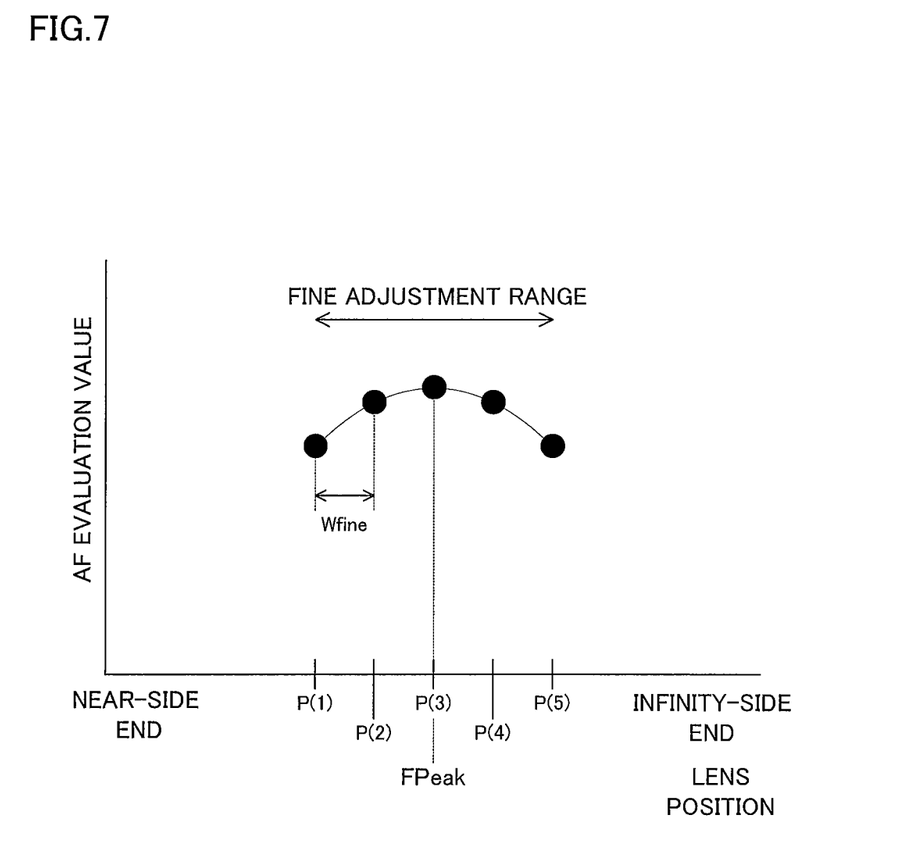
FIG. 7 is a graph showing one example of a fine-adjustment AF operation.

Upon completion of the adjustment of the imaging cycle, the focus lens 12 is placed at a near-side end portion of the fine adjustment range shown in FIG. 7, and is moved toward the infinity-side end portion by each moving amount Wfine. Herein, "Wfine" is smaller than "Wrough". Similarly to the above-described case, the focus evaluating circuit 26 outputs, as an AF evaluation value Yh(i), the high-frequency component of the object scene image captured at each of the plurality of lens positions P(i) (i: 1, 2, 3, ... ) separated by the distance equivalent to the moving amount Wfine. On a fine adjustment-use table TBL2 shown in FIG. 4(B), the AF evaluation values Yh(i) thus obtained are written.

Figure 4:
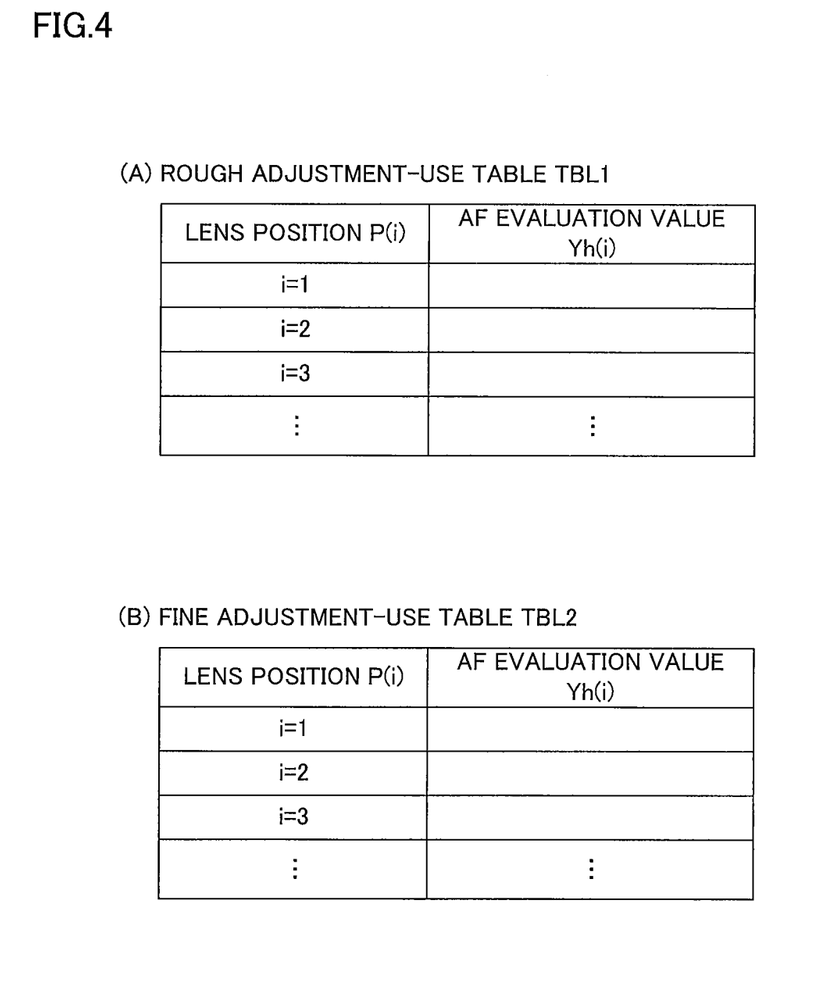
FIG. 4(A) is an illustrative view showing one example of a rough adjustment-use table.
FIG. 4(B) is an illustrative view showing one example of a fine adjustment-use table.

When the AF evaluation value Yh(i) corresponding to the infinity-side end portion of the fine adjustment range is acquired, the maximum AF evaluation value is detected from the fine adjustment-use table TBL2, and the lens position corresponding to the detected maximum AF evaluation value is specified as a finalized peak position FPeak (position corresponding to the focal point). The focus lens 12 is placed at the thus-specified finalized peak position Fpeak.

According to FIG. 7, the AF evaluation value is maximum corresponding to the lens position P(3), and the lens position P(3) is set as the finalized peak position FPeak. The focus lens 12 is placed at the lens position P(3).

The CPU 30 executes a process according to an imaging task shown in FIG. 8 to FIG. 12. A control program corresponding to the imaging task is stored in a flash memory 44.

Figure 8:
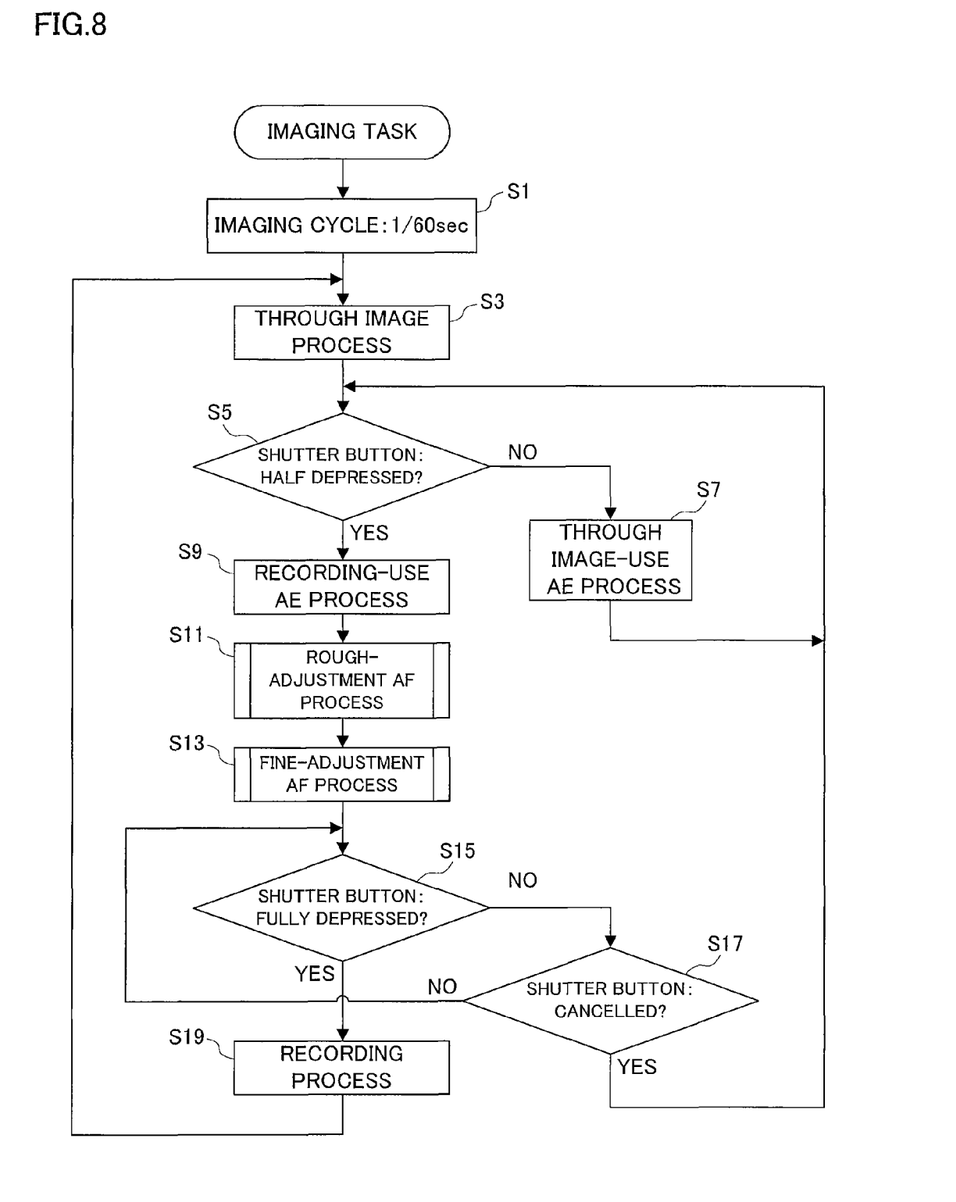
FIG. 8 is a flowchart showing one portion of an operation of a CPU applied to the embodiment in FIG. 2.

Firstly, in a step S1, the imaging cycle is set to "1/60 seconds", and in a step S3, the through-image process is executed. As a result, the through image based on the raw image data having a frame rate of 60 fps is outputted from the LCD monitor 38. In a step S5, it is determined whether or not the shutter button 28s is half-depressed, and as long as a determination result indicates NO, the through image-use AE process in a step S7 is repeated. As a result, the brightness of the through image is adjusted moderately.

When the shutter button 28s is half-depressed, the recording-use AE process is executed in a step S9. In steps S11 and S13, the rough-adjustment AF process and the fine-adjustment AF process are executed, respectively. The brightness of the through image is strictly adjusted by the recording-use AE process. Moreover, the focal point is roughly specified by the rough-adjustment AF process, and the focal point is strictly specified by the fine-adjustment AF process. The focus lens 12 is placed at a position corresponding to the thus specified focal point.

In a step S15, it is determined whether or not the shutter button 28s is fully depressed, and in a step S17, it is determined whether or not the manipulation of the shutter button 28s is cancelled. When YES is determined in the step S15, the process returns to the step S3 after undergoing a recording process in a step S19. When YES is determined in the step S17, the process returns to the step S5 as it is.

Figure 9:
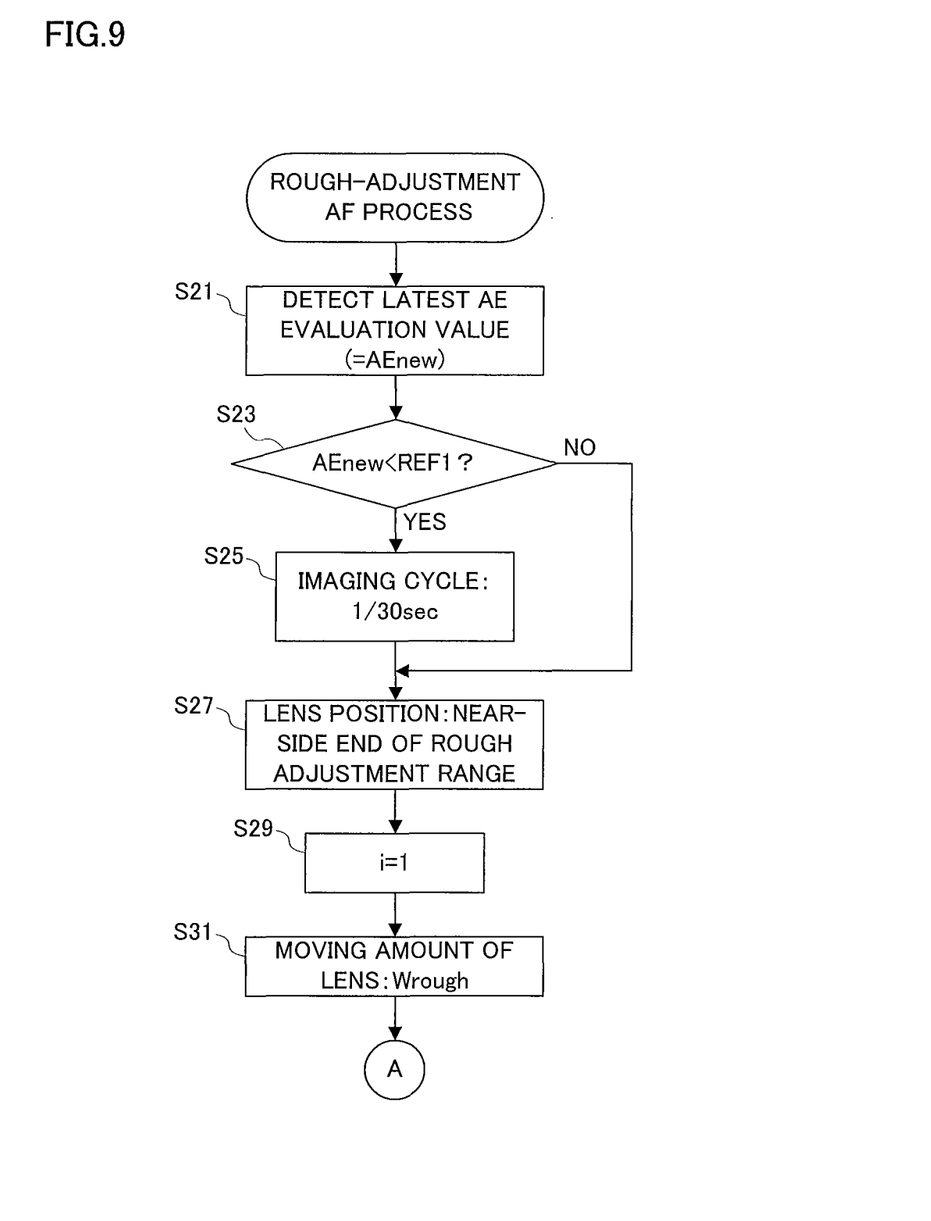
FIG. 9 is a flowchart showing another portion of the operation of the CPU applied to the embodiment in FIG. 2.
Figure 10:
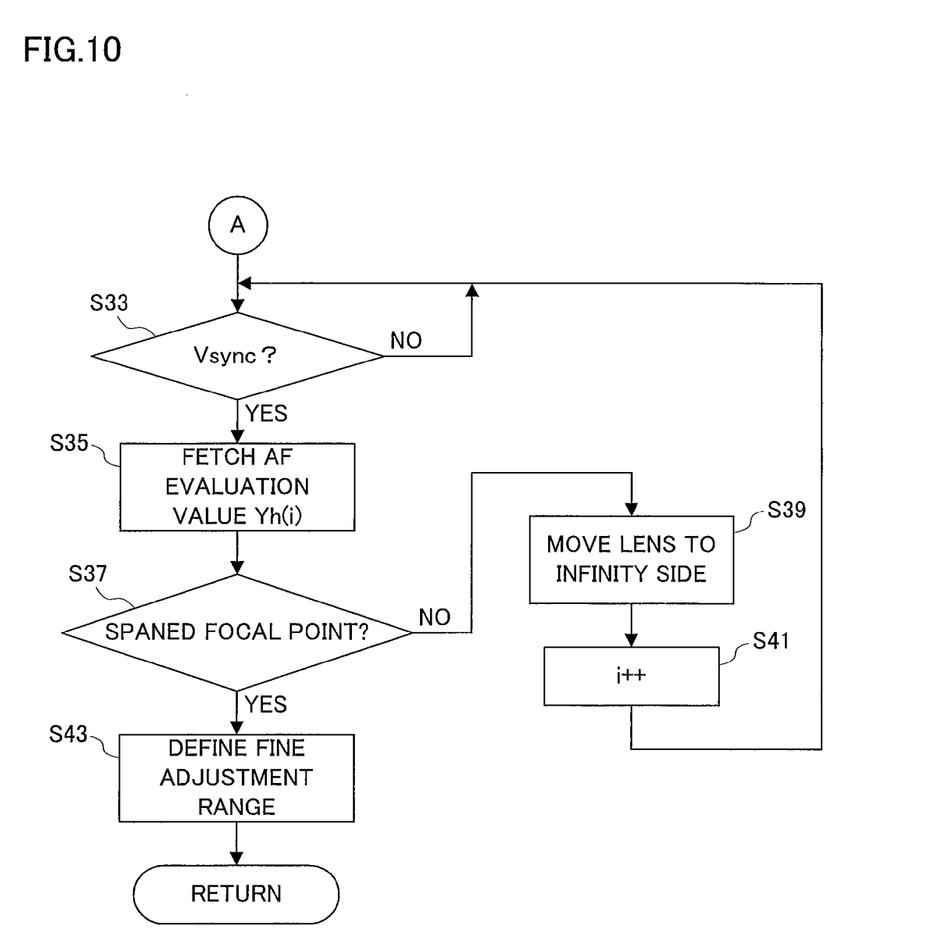
FIG. 10 is a flowchart showing still another portion of the operation of the CPU applied to the embodiment in FIG. 2.

The rough-adjustment AF process in a step S11 is executed according to a subroutine shown in FIG. 9 and FIG. 10. Firstly, in a step S21, the latest AE evaluation value referred to for the recording-use AE process is detected as "AEnew". In a step S23, it is determined whether or not the detected latest AE evaluation value AFnew falls below the reference value REF1. When a determination result is YES, the process advances to a step S27 after setting the imaging cycle to "1/30 seconds" in a step S25. When a determination result is NO, the process directly advances to the step S27.

In the step S27, the focus lens 12 is placed at the near-side end portion of the rough adjustment range. In a step S29, a variable i is set to "1", and in a step S31, the moving amount of the focus lens 12 is set to "Wrough". When the vertical synchronization signal Vsync is generated, the process advances from a step S33 to a step S35 in which to fetch the AF evaluation value Yh(i) from the focus evaluating circuit 26. The fetched AF evaluation value Yh(i) is written on the rough adjustment-use table TBL1 shown in FIG. 4(A) in association with the lens position P(i).

In a step S37, it is determined whether or not the focus lens 12 has spanned the focal point based on a plurality of AF evaluation values written on the rough adjustment-use table TBL1. If NO is determined in this step, the focus lens 12 is moved by the moving amount Wrough to the infinity side in a step S39, and the variable i is incremented in a step S41. Then, the process returns to the step S33. When a determination result in the step S37 is YES, the process advances to a step S43. In the step S43, the lens position corresponding to the maximum AF evaluation value AFmax registered in the register RGST1 is detected as the provisional peak position PPeak, and a part of the range including the detected provisional peak position is defined as the fine adjustment range. Upon completion of the process in the step S43, the process is restored to the routine at a hierarchical upper level.

Figure 11:
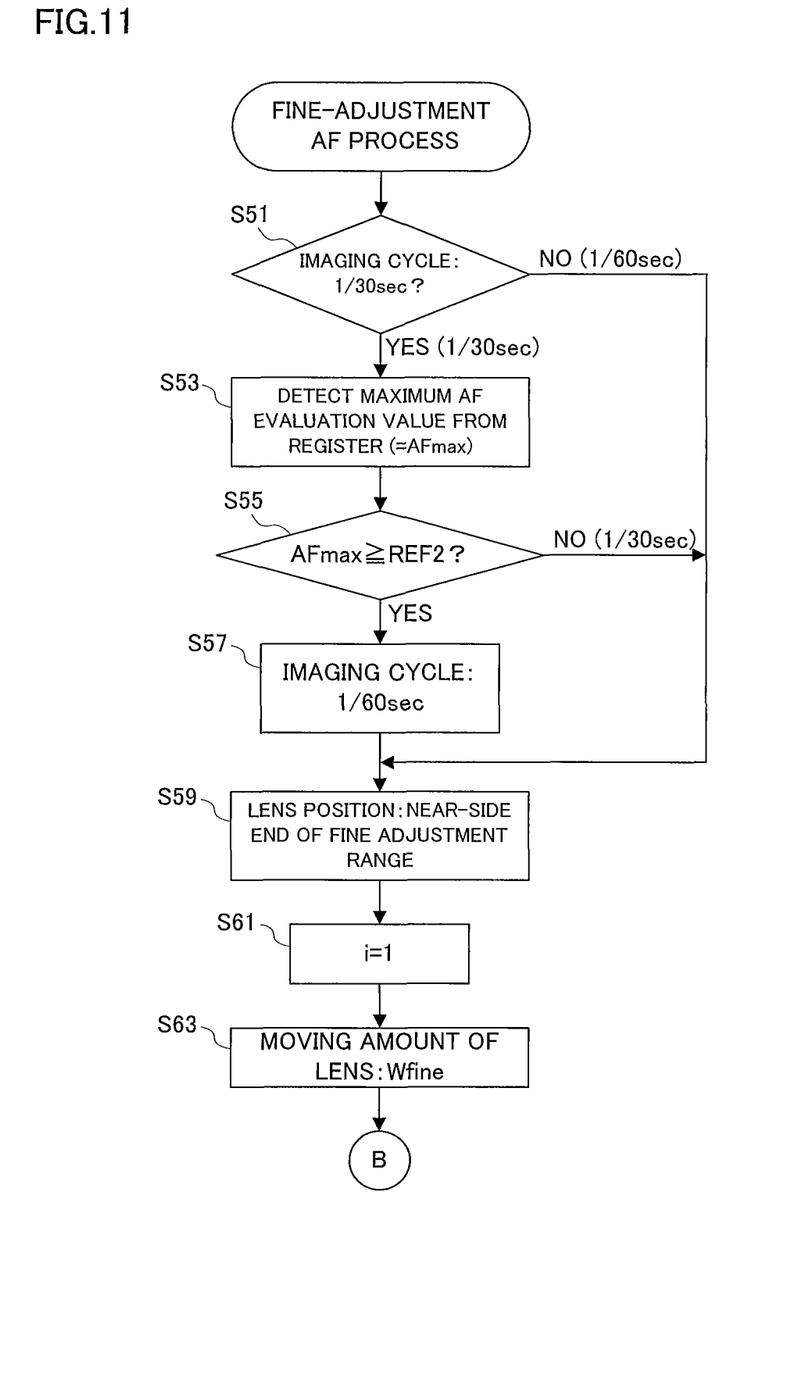
FIG. 11 is a flowchart showing yet still another portion of the operation of the CPU applied to the embodiment in FIG. 2.
Figure 12:
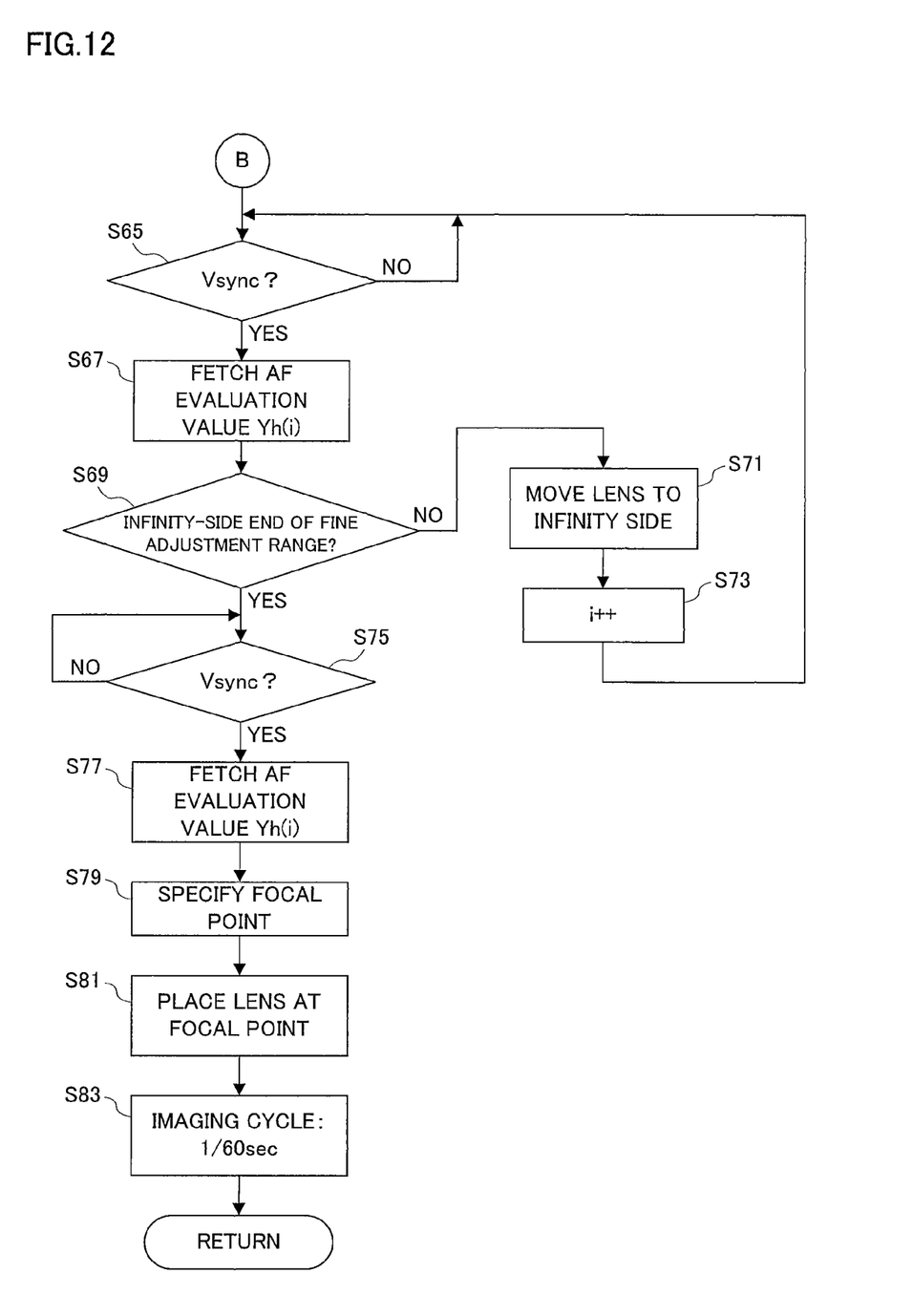
FIG. 12 is a flowchart showing another portion of the operation of the CPU applied to the embodiment in FIG. 2.

The fine-adjustment AF process in a step S13 shown in FIG. 8 is executed according to a subroutine shown in FIG. 11 and FIG. 12. Firstly, in a step S51, it is determined whether or not the imaging cycle at a current time point is ⅓₀ seconds, and when a determination result is YES, the process advances to a step S53 while when the determination result is NO, the process advances to a step S59.

In the step S53, the maximum AF evaluation value AFmax is detected from the register RGST1, and in a step S55, it is determined whether or not the detected maximum AF evaluation value AFmax is equal to or more than the reference value REF2. When a determination result is NO, the process directly advances to the step S59. When a determination result is YES, the process advances to the step S59 after setting the imaging cycle to "⅟₆₀ seconds" in a step S57.

In the step S59, the focus lens 12 is placed at the near-side end portion of the fine adjustment range. In a step S61, the variable i is set to "1", and in a step S63, the moving amount of the focus lens 12 is set to "Wfine". When the vertical synchronization signal Vsync is generated, the process advances from a step S65 to a step S67 in which to fetch the AF evaluation value Yh(i) from the focus evaluating circuit 26. The fetched AF evaluation value Yh(i) is written on the fine adjustment-use table TBL2 shown in FIG. 4(B) in association with the lens position P(i).

In a step S69, it is determined whether or not the focus lens 12 reaches the infinity-side end portion of the fine adjustment range. If NO is determined in this step, the focus lens 12 is moved by the moving amount Wfine to the infinity side in a step S71. Upon completion of the moving process, the variable i is incremented in a step S73, and then, the process returns to the step S65.

When YES is determined in the step S69, the process waits for the generation of the vertical synchronization signal Vsync, and then, advances from a step S75 to a step S77 in which to fetch the AF evaluation value Yh(i+1) from the focus evaluating circuit 26. The fetched AF evaluation value Yh(i+1) is written on the fine adjustment-use table TBL2 in association with the lens position P(i+1).

It is noted that the processes from the steps S75 to S77 are those performed in consideration of a fact that the output operation of the raw image data from the imaging device 16 is delayed by 1-frame period from the exposure operation of the imaging surface.

In a step S79, the maximum AF evaluation value is detected from the fine adjustment-use table TBL2, and the lens position corresponding to the detected maximum AF evaluation value is specified as the finalized peak position FPeak. In a step S81, the focus lens 12 is placed at the specified, finalized peak position FPeak. Upon completion of placing the focus lens 12, the imaging cycle is set to "⅟₆₀ seconds" in a step S83, and then, the process is restored to the routine at a hierarchical upper level.

As can be seen from the above-described explanation, the imaging device 16 has the imaging surface capturing an object scene through the focus lens 12, and cyclically outputs the object scene image. In the rough-adjustment AF process, the CPU 30 adjusts the length of the imaging cycle to the length corresponding to the illuminance of the object scene (S21 to S25), and moves the focus lens 12 by each "Wrough" (S39). Furthermore, the CPU 30 specifies, as the fine adjustment range, the distance range including the focal point, based on the object scene image outputted from the imaging device 16, in parallel with the lens moving process for each "Wrough" (S35, S43).

In the fine-adjustment AF process, the CPU 30 adjusts the length of the imaging cycle to the length corresponding to the contrast of the object scene (S53 to S57), and moves the focus lens 12 in the fine adjustment range by each "Wfine" (S71). Furthermore, the CPU 30 specifies a distance corresponding to a focal point based on the object scene image outputted from the imaging device 16, in parallel with the lens moving process for each "Wfine" (S67, S77, and S79).

Thus, the position of the focus lens 12 is changed, firstly, in order to specify the fine adjustment range, then, to specify the distance corresponding to the focal point. Moreover, both the fine adjustment range and the distance corresponding to a focal point are specified based on the object scene image outputted from the imaging device 16. Furthermore, the length of the imaging cycle is adjusted with reference to the illuminance of the object scene when the fine adjustment range is specified, and adjusted with reference to the contrast of the object scene when the focal point is specified.

The length of the designated cycle is adjusted with reference to the illuminance of the object scene when the focal point is roughly specified while the length of the designated cycle is adjusted with reference to the contrast of the object scene when the focal point is strictly specified. In this way, it is possible to improve a focal performance relative to an object of a high contrast present under a low illuminance.

It is noted that in this embodiment, the focus lens 12 is moved in an optical axis direction at a time of the AF process. However, instead of the focus lens 12 or together with the focus lens 12, the imaging surface may be optionally moved in the optical axis direction.

Also, in this embodiment, during the rough-adjustment AF process, the lens moving operation is ended at a time point when the focus lens 12 spans the focal point (see the step S37 in FIG. 10). However, the rough adjustment process may be optionally ended after the focus lens 12 reaches the infinity-side end portion of the rough adjustment range.

Moreover, in this embodiment, in both the rough-adjustment AF process and the fine-adjustment AF process, the focus lens 12 is moved from near the near-side end portion to the infinity side (see the steps S27 and S39 in FIG. 9 and FIG. 10, and the steps S57 and S69 in FIG. 11 and FIG. 12).

However, in the fine-adjustment AF process executed after the rough-adjustment AF process, the focus lens 12 may be optionally moved from the infinity-side end portion to the near side. Also, the focus lens 12 may be optionally moved from the infinity-side end portion to the near-side end portion, during the rough-adjustment AF process.

Moreover, in this embodiment, during the fine-adjustment AF process, the lens moving operation is continued until the focus lens 12 reaches the infinity-side end portion in the fine adjustment range (see the step S67 in FIG. 12). However, during the fine-adjustment AF process executed after the rough-adjustment AF process, the lens moving operation may be optionally ended at a time point when the focus lens 12 spans the focal point.

Furthermore, in this embodiment, the lens position corresponding to the maximum AF evaluation value written on the fine adjustment-use table TBL2 is detected as the finalized peak position FPeak. However, the finalized peak position FPeak may also be detected as follows: the plurality of AF evaluation values written on the fine adjustment-use table TBL2 are plotted along an approximate curve, and the lens position corresponding to a peak of the resultant approximate curve is detected as the finalized peak position FPeak.

Also, in this embodiment, in order to determine the level of the contrast of the object belonging to the object scene, the magnitude of the maximum AF evaluation value is utilized. However, any other index may be optionally utilized as long as it is possible to use as a rough indication to determine the level of the contrast.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager having an imaging surface that captures a scene through a focus lens and outputting an electronic image representing the scene in a designated cycle;
   a first changer which changes a distance from the focus lens to the imaging surface;
   a first adjustor which adjusts a length of the designated cycle to a length being different depending on an illuminance of the scene, in association with the change process of said first changer;
   a first specifier which specifies a distance range including a focal point based on the electronic image outputted from said imager, in parallel with the change process of said first changer;
   a second changer which changes the distance from the focus lens to the imaging surface in the distance range specified by said first specifier;
   a second adjustor which adjusts the length of the designated cycle to a length being different depending on a contrast of the scene during the change process of said second changer such that a frame rate that corresponds to the length of the designated cycle is set to a high frame rate if the contrast is high and a low frame rate if the contrast is low; and
   a second specifier which specifies a distance equivalent to the focal point based on the electronic image outputted from said imager, in parallel with the change process of said second changer.

2. An electronic camera according to claim 1, wherein said first changer changes the distance by each first amount, and said second changer changes the distance by each second amount smaller than the first amount.

3. An electronic camera according to claim 1, wherein each of said first changer and said second changer changes the distance in the designated cycle.

4. An electronic camera according to claim 1, wherein said first adjustor shortens the length of the designated cycle as the illuminance of the scene is greater.

5. An electronic camera according to claim 1, further comprising a detector which detects a high-frequency component of the electronic image outputted from said imager, wherein said second adjustor includes a determiner which determines a magnitude of the contrast based on the high-frequency component detected by said detector, in parallel with the change process of said first changer.

6. An electronic camera according to claim 1, further comprising a limiter which limits the adjustment process of said second adjustor when the length adjusted by said first adjustor satisfies a predetermined condition.

7. A camera control program recorded on a non-transitory recording medium in order to control an electronic camera provided with an imager having an imaging surface that captures a scene through a focus lens and outputting an electronic image representing the scene in a designated cycle, the program causing a processor of the electronic camera to perform the steps comprising:
   a first changing step of changing a distance from the focus lens to the imaging surface;
   a first adjusting step of adjusting a length of the designated cycle to a length being different depending on an illuminance of the scene, in association with the change process in said first changing step;
   a first specifying step of specifying a distance range including a focal point based on the electronic image outputted from said imager, in parallel with the change process in said first changing step;
   a second changing step of changing the distance from the focus lens to the imaging surface in the distance range specified by said first specifying step;
   a second adjusting step of adjusting the length of the designated cycle to a length being different depending on a contrast of the scene during the change process in said second changing step such that a frame rate that corresponds to the length of the designated cycle is set to a high frame rate if the contrast is high and a low frame rate if the contrast is low; and
   a second specifying step of specifying a distance equivalent to the focal point based on the electronic image outputted from said imager, in parallel with the change process in said second changing step.

8. A focusing control method executed by an electronic camera provided with an imager having an imaging surface that captures a scene through a focus lens and outputting an electronic image representing the scene in a designated cycle, comprising:
   a first changing step of changing a distance from the focus lens to the imaging surface;
   a first adjusting step of adjusting a length of the designated cycle to a length being different depending on an illuminance of the scene, in association with the change process in said first changing step;
   a first specifying step of specifying a distance range including a focal point based on the electronic image outputted from said imager, in parallel with the change process in said first changing step;
   a second changing step of changing the distance from the focus lens to the imaging surface in the distance range specified by said first specifying step;

a second adjusting step of adjusting the length of the designated cycle to a length being different depending on a contrast of the scene during the change process in said second changing step such that a frame rate that corresponds to the length of the designated cycle is set to a high frame rate if the contrast is high and a low frame rate if the contrast is low; and a second specifying step of specifying a distance equivalent to the focal point based on the electronic image outputted from said imager, in parallel with the change process in said second changing step.

\* \* \* \* \*